(12) United States Patent
Wong et al.

(10) Patent No.: US 10,855,048 B2
(45) Date of Patent: Dec. 1, 2020

(54) AIRY-BEAM OPTICAL SWEPT SOURCE

(71) Applicant: THE UNIVERSITY OF HONG KONG, Hong Kong (CN)

(72) Inventors: Kin Yip Kenneth Wong, Hong Kong (CN); Xiaoming Wei, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 29 days.

(21) Appl. No.: 16/099,043

(22) PCT Filed: Jun. 1, 2017

(86) PCT No.: PCT/CN2017/086848
§ 371 (c)(1),
(2) Date: Nov. 5, 2018

(87) PCT Pub. No.: WO2017/206929
PCT Pub. Date: Dec. 7, 2017

(65) Prior Publication Data
US 2019/0173260 A1    Jun. 6, 2019

Related U.S. Application Data

(60) Provisional application No. 62/344,323, filed on Jun. 1, 2016.

(51) Int. Cl.
*H01S 3/11* (2006.01)
*H01S 3/067* (2006.01)
(Continued)

(52) U.S. Cl.
CPC .......... *H01S 3/1112* (2013.01); *H01S 3/0057* (2013.01); *H01S 3/06791* (2013.01);
(Continued)

(58) Field of Classification Search
CPC .. H01S 3/1112; H01S 3/0057; H01S 3/08004; H01S 3/08013; H01S 3/10061;
(Continued)

(56) References Cited

U.S. PATENT DOCUMENTS 5,513,194 A * 4/1996 Tamura ............... H01S 3/06791
372/6
6,215,566 B1 * 4/2001 Miyazaki ............... H01S 3/067
398/9

(Continued)

FOREIGN PATENT DOCUMENTS

| CN | 1280408 A | 1/2001 |
| CN | 103048791 A | 4/2013 |

(Continued)

OTHER PUBLICATIONS

International Search Report in International Application No. PCT/CN2017/086848, filed Jun. 1, 2017.

*Primary Examiner* — Yuanda Zhang
(74) *Attorney, Agent, or Firm* — Saliwanchik, Lloyd & Eisenschenk

(57) ABSTRACT

Briefly, methods and/or systems, are described for a wavelength-dispersive mode-locked fiber-ring laser, which generates an Airy beam profile for stable optical pulses.

14 Claims, 4 Drawing Sheets

(51) Int. Cl.
  *H01S 3/16* (2006.01)
  *H01S 3/00* (2006.01)
  *H01S 3/08* (2006.01)
  *H01S 3/10* (2006.01)
  *H01S 3/108* (2006.01)
  *H01S 3/109* (2006.01)

(52) U.S. Cl.
  CPC ...... *H01S 3/08004* (2013.01); *H01S 3/08013* (2013.01); *H01S 3/109* (2013.01); *H01S 3/10061* (2013.01); *H01S 3/1083* (2013.01); *H01S 3/1618* (2013.01); *H01S 3/0092* (2013.01); *H01S 3/06712* (2013.01)

(58) Field of Classification Search
  CPC .... H01S 3/1083; H01S 3/109; H01S 3/06791; H01S 3/1618; H01S 3/06712; H01S 3/0092
  See application file for complete search history.

(56) References Cited

U.S. PATENT DOCUMENTS

| | | |
|---|---|---|
| 7,876,803 B1 * | 1/2011 | Di Teodoro .............. G02F 1/37 372/94 |
| 8,101,929 B1 | 1/2012 | Christodoulides et al. |
| 2004/0114641 A1 * | 6/2004 | Wise .................... H01S 3/06791 372/6 |
| 2006/0198399 A1 * | 9/2006 | Jablonski ............... B82Y 10/00 372/10 |
| 2009/0003391 A1 * | 1/2009 | Li ......................... H01S 3/0675 372/6 |
| 2011/0133104 A1 | 6/2011 | Dholakia et al. |
| 2015/0200518 A1 * | 7/2015 | Aguergaray ........ H01S 3/06712 372/6 |
| 2017/0082845 A1 * | 3/2017 | Chen .................. G02B 21/0048 |

FOREIGN PATENT DOCUMENTS

| | | |
|---|---|---|
| CN | 103996962 A | 8/2014 |
| CN | 203850614 U | 9/2014 |
| CN | 104765153 A | 7/2015 |

* cited by examiner

AIRY-BEAM OPTICAL SWEPT SOURCE

CROSS-REFERENCE TO RELATED APPLICATIONS

This application is the U.S. national stage application of International Patent Application No. PCT/CN2017/086848, filed Jun. 1, 2017, which claims the benefit of U.S. Provisional Application No. 62/344,323, filed Jun. 1, 2016, the disclosure of each of which is incorporated herein by reference in its entirety.

BACKGROUND

1. Field

This disclosure relates generally to an optical system that generates a wavelength-dispersed, mode-locked Airy beam.

2. Information

In certain types of situations, ultrafast optical systems may be used for metrology, spectroscopy, spectrally-encoding microscopy, optical coherence tomography (OCT) and/or photoacoustic tomography (PAT), for example. Optical coherence tomography (OCT) refers to a technique that uses light to image features from within optical scattering media, such as biological tissue, in three dimensions with micrometer-resolution. In general, if a relatively longer wavelength light is used, there typically is relatively greater penetration into a scattering medium. OCT is based at least in part on low-coherence interferometry typically employing near-infrared light. OCT has a relatively short coherence length with respect to conventional interferometry. OCT uses a relatively broad-bandwidth light source to confine interference over a ~100 nm wavelength band depending at least in part on properties of light sources employed, e.g. super-luminescent diodes, ultrashort pulsed lasers, and/or supercontinuum lasers.

A relatively high power, relatively broadband light may be generated from a super-luminescent diode or a femtosecond-pulse laser, e.g. compared to a lower power white light. However, optical pulse repetition rates may be typically limited to a range of 10-100's kHz due at least in part to mechanical scanning inertia, slow electrically tuning response, and/or interferometric techniques, such as used in various OCT techniques.

Ultrafast laser systems, however, may exhibit chirp, e.g. where an optical pulse interaction with a dispersive material may increase or decrease dispersion as propagation takes place. A chirped signal frequency may increase or decrease with time. In some situations, the term chirp is used interchangeably with sweep, e.g. sweep-source or sweep-signal. Operating ranges may be limited to certain wavelengths, e.g. those supported by optical communication technologies at 0.85, 1.06, and 1.31 µm. Other wavelength operating ranges may be excluded by not having an appropriate broadband gain medium for implementing wideband wavelength sweeping. Terms, such as chirped signal, swept source and/or wavelength sweeping laser, describe light optical beams used in some optical imaging techniques. Coherence length is approximately proportional to width of a wavelength distribution of a wave packet comprising an optical pulse and approximately proportional to a corresponding coherence time, while inversely proportional to frequency spectral bandwidth. Approximations are dependent at least partially on dispersion relations, e.g. as may be determined at least partially by propagation in vacuum or within an optical fiber. Thus, it may be a challenge to concurrently achieve a relatively high optical pulse repetition rate and an adequate coherence at a particular operating wavelength.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
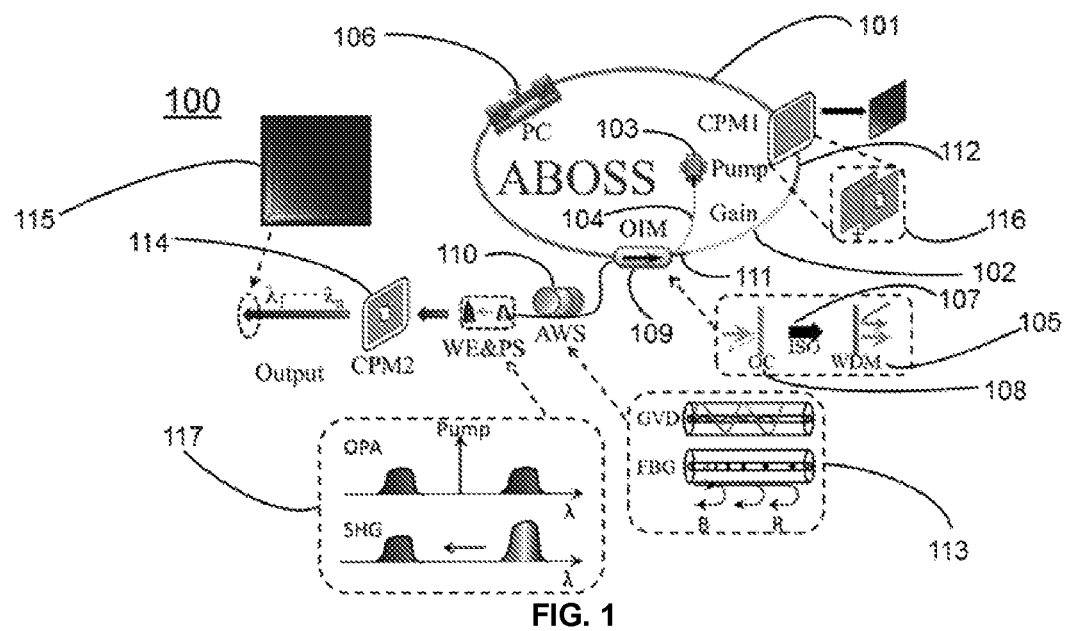
FIG. 1 is a schematic diagram illustrating an embodiment of a wavelength-dispersed mode-locked Airy-beam.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of subject matter intended to be covered by one or more claims (e.g., claimed subject matter). Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in relation to a particular implementation and/or embodiment is included in at least one implementation and/or embodiment of subject matter intended to be covered by one or more claims. Thus, appearances of such phrases, for example, in various places throughout this specification are not necessarily intended to refer to the same implementation and/or embodiment or to any one particular implementation and/or embodiment. Furthermore, it is to be understood that particular features, structures, and/or characteristics described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, in general, "in this context" in general without further qualification refers to the context of the present patent application.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are in direct physically tangible, including electrically tangible (e.g., as previously discussed), contact; while, "coupled," is used to mean that two or more tangible components and/or the like are potentially in direct physically tangible, potentially including electrically tangible, contact; "coupled," nonetheless, is also used to mean that two or more tangible components and/or the like are not necessarily in direct physically tangible contact, but are able to co-operate and/or interact, such as, for example, by being "optically coupled." Likewise, in a particular context, such as in which tangible components are discussed, the term coupled is also understood to mean indirectly connected. It is further noted, in the context of the present patent application, since memory, such as a memory component and/or memory states, is intended to be non-transitory, the term physical, at least if used in relation memory necessarily implies tangible.

Additionally, in the present patent application, in a particular context of usage, such as in which tangible components (and/or similarly, tangible materials) are being discussed the term optical is used, as pertaining to an optical portion and/or an infrared (IR) portion of the electromagnetic radiation spectrum, e.g. optical radiation may refer to near-IR radiation. These descriptions refer to broad ranges or characteristics of the optical and/or near-IR radiation. If necessary numerical values are used to more precisely specify the optical characteristics or components.

Additionally, in the present patent application, in a particular context of usage, such as in which tangible components (and/or similarly, tangible materials) are being discussed, a distinction exists between being "on" and being "over." As an example, deposition of a substance "on" a substrate refers to a deposition involving direct physically tangible contact without an intermediary, such as an intermediary substance, between the substance deposited and the substrate in this latter example; nonetheless, deposition "over" a substrate, while generally understood to potentially include deposition "on" a substrate (since being "on" may also accurately be described as being "over"), is generally understood to include a situation in which one or more intermediaries, such as one or more intermediary substances, are present between the substance deposited and the substrate so that the substance deposited is not necessarily in direct physically tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physically tangible contact (similar to "on," as just described), "under" potentially includes a situation in which there is direct physically tangible contact, but does not necessarily imply direct physically tangible contact, such as if one or more intermediaries, such as one or more intermediary substances, are present. Thus, "on" is understood to mean "immediately over" and "beneath" is understood to mean "immediately under."

It is likewise appreciated that terms such as "over" or "under" are understood in a similar manner as the terms up, down, top, bottom, and so on, previously mentioned. These terms may be used to facilitate discussion, but are not intended to necessarily restrict scope of subject matter covered by one or more claims. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, "or" if used to associate a list, such as A, B or C, is intended to mean A, B, and C, here used in the inclusive sense, as well as A, B or C, here used in the exclusive sense. With this understanding, "and" is used in the inclusive sense and intended to mean A, B and C; whereas "and/or" can be used in an abundance of caution to make clear that all of the foregoing meanings are intended, although such usage is not required. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described.

It is further noted that the terms "type" and/or "like" if used, such as with a feature, structure and/or characteristic, using "optical" or "electrical" as simple examples, means at least partially of and/or relating to the feature, structure and/or characteristic in such a way that presence of minor variations, even variations that might otherwise not be considered fully consistent with the feature, structure and/or characteristic, do not in general inhibit the feature, structure and/or characteristic from being of a "type" and/or being "like," (such as being an "optical-type" or being "optical-like," for example) if the minor variations are sufficiently minor so that the feature, structure and/or characteristic would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the following description merely provides one or more illustrative examples and claimed subject matter is intended to not be limited to one or more illustrative examples; however, again, as has always been the with respect to the specification of a patent application, particular context of description and/or usage provides helpful guidance regarding reasonable inferences to be drawn.

Furthermore, if a value, such as of a physical property, as an example, relates to implementation of claimed subject matter and is subject to testing, measurement and/or specification regarding degree; however, likewise, if alternatively reasonable approaches to testing, measurement and/or specification regarding degree, at least with respect to the property, continuing with the example, are reasonably likely to occur to one of ordinary skill, in which the alternatively reasonable approaches are in general individually sufficient (e.g., adequate), at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of optical, electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

The term operating wavelength or central wavelength refers to a first order statistic for a wavelength distribution, e.g. a mean, median, or average. A corresponding measure of width of a wavelength distribution refers to a second order statistic, e.g. a width of a distribution at a 3 dB relative power, a variance, etc. Wavelength width of an optical pulse or wave-packet distribution has a correspondence with a coherence length, such as a longitudinal coherence length, and/or as an approximately proportional coherence time, and/or is approximately inversely proportional to spectral bandwidth. More precise relations may be described for particular dispersion properties, e.g. a wavelength dispersion resulting from light transmission through an optical fiber.

In some three dimensional, high spatial resolution optical imaging applications, as previously suggested, it may become a challenge to concurrently achieve repetition rates at or above a 10 MHz range, a spatial coherence at least on the order of 100 nm, and/or a near-IR operating wavelength of approximately 1000 nm.

Beam profiles delivered by lasers may typically be Gaussian-shaped and diffraction limited. Alternatively, an Airy beam profile may be relatively diffraction-free, self-healing, and may extend depth of focus (DOF) and/or enlarge the field of view (FOV) depending at least in part on optical configuration. This may be beneficial for applications where non-diffraction, larger penetration depth, and/or better resolution features, for example, are desired.

An embodiment 100 may comprise a mode-locked fiber-ring laser, an external wavelength-modulator optical component, and a cubic phase mask to produce an Airy-beam profile for relatively high repetition rate, relatively low coherence optical pulses, e.g. FIG. 1 shows an example system embodiment substantially in accordance with claimed subject matter. As shall be described, this approach may, for example, provide an apparatus and/or a method for achieving relatively low coherence at relatively fast imaging rates using optical pulses operating in the near infrared (near-IR) and/or in the visible light regime. It may be useful in some applications to have a longitudinally coherent laser pulse, such as typically where three dimensional imaging at relatively high spatial resolution is of use. Longitudinal spatial coherence has a corresponding temporal coherence, which may be related at least partially to material dispersion properties, e.g. if a fiber-ring laser is used. In an embodiment, for example, coherence time may thus be approximately related to wavelength distribution of a wave packet for an optical pulse within a fiber-ring cavity. It may also be useful at least in some cases to further extend depth of field (DOF) of an imaging system by using a wave-front coding technique.

It may further be useful in some applications to have an optical beam whose operating wavelength is relatively long compared to visible light to achieve greater penetration depth for an optical media to be imaged, e.g. in an embodiment below near-IR optical pulses may be produced having approximately a 1045 nm operating wavelength.

For ultrafast detection and/or imaging application, it may be desirable to exceed limitations introduced by mechanical scanning, time-integrated sensors, and/or inertial effects due at least partially to interferometric methods, e.g. a sweep rate or repetition rate of a corresponding optical modulation, which is typically in the 10-100's of kHz range. To improve repetition-rate, a pulsed laser optical system may be introduced, which may in an example embodiment based at least in part on a mode-locked fiber-ring cavity 101. Mode-locking refers to a technique where a laser may produce pulses of light of relatively short duration in the extreme, e.g. on the order of femtoseconds ($10^{-15}$ sec). A laser is said to be phase-locked or mode-locked basis if a substantially fixed-phase relationship between longitudinal modes of a resonant cavity is induced. Interference between these modes may generate laser light as a train of pulses. In embodiments below, a mode-locked repetition rate approximately around the range of 10 MHz is demonstrated, which corresponds to a sweep period of 100 nsec. In other embodiments, repetition rate may be changed, for example, by tuning the fiber-ring cavity length.

FIG. 1 shows an embodiment 100 of a dispersive mode-locked Airy beam system. As alluded to previously, a fiber-ring cavity 101 may be employed, which may comprise a gain medium 102. It may be desirable for wavelength of a pump source to correspond with a working wavelength window of a fiber-ring cavity, such as 101. An active gain medium may comprise an optical fiber doped with rare-earth elements, e.g. such as erbium, ytterbium, neodymium, dysprosium, praseodymium, thulium and/or holmium. In an embodiment, for example, a 0.5 m length of ytterbium-doped fiber (YDF, Thorlabs YB1200-4/125) may be pumped via a 600 mW laser-diode 103 operating at 980 nm and coupled to a fiber-cavity by a single-mode fiber-pigtail 104 and a wavelength-division multiplexer (WDM) 105.

If driven by a pump source 103, a fiber-ring laser may exhibit mode-locking, at least in part by nonlinear polarization rotation (NPR) induced by light-fiber-ring cavity interaction. One approach to achieve relatively stable and relatively high power operation may be to adjust and to filter polarization of mode-locked optical pulses. For example, 106 of FIG. 1 may adjust polarization and 107 may permit filtering so that pulses may mutually interfere less. In one embodiment, optical coupling (OC) 108, polarization filtering 107, and WDM 105, may be integrated in an optically-integrated-module (01M) 109. Mode-locked operation may, for example, in an embodiment, be initiated at a pump power of approximately 250 mW with maximum average power of a fiber-ring cavity, such as 101, being approximately 110 mW. WDM 105 may multiplex optical pulses of a 980 nm wavelength and a 1045 nm. An optical coupler 108 may be employed so that optical pulses pass to an additional wavelength sweeping component (AWS) 110, described in greater detail below for an example embodiment.

Nonlinear polarization rotation (NPR) refer to an effect in which linearly polarized light incident to a weakly birefringent fiber produces elliptically polarized light within the fiber. Orientation and ellipticity of light polarization may at least partially be influenced by fiber length and/or birefringence. However, if light intensity is relatively strong, a non-linear optical Kerr effect may also affect light polarization in a manner at least in part related to light intensity. Thus, with a polarizer put behind a fiber, light polarization may become at least partially light intensity dependent. Likewise, orientation of a polarizer and/or a length of a fiber may affect absorption so that with an ultra-fast light of higher intensity may experience less absorption loss. Thus, a NPR technique may make use of less absorption to achieve a passive mode locking in a fiber-ring cavity. After a mode-locked pulse is formed, non-linearity of a fiber may further shape a pulse into an optical solution so that stable optical pulses may result. An optical Kerr effect refers to an effect in which an electric field results in a variation in index of refraction, which may be proportional to local light irradiance. This refractive index variation may produce nonlinear optical effects including self-phase modulation and/or cross-phase modulation, may produce NPR mode-locking in conjunction with polarization filtering.

Thus, in an embodiment, a NPR mode-locking fiber-ring cavity may exhibit self-phase modulation (SPM) and/or cross-phase modulation (XPM). Self-phase modulation (SPM) refers to a nonlinear optical effect due at least in part to light-matter interaction. An ultrashort pulse of light, travelling in a medium, may induce a varying refractive index due at least in part to the optical Kerr effect, as mentioned. This variation in refractive index may result in a pulse phase shift, leading to a change in frequency spectrum. Thus, in self-phase modulation, a laser beam propagating in a medium interacts with the medium and imposes a phase modulation on itself. A strong field of a laser beam, for example, is capable of inducing an appreciable intensity-related refractive index change in the medium, so that the medium produces a phase change on an incoming wave, resulting in SPM. In the case of a pulsed laser input signal, temporal variation of laser intensity may lead to SPM in time. A time derivative of phase of a wave is the angular frequency of wave. Thus, SPM may appear as a frequency modulation, in which case an output beam may have self-induced spectral broadening. XPM is a related nonlinear effect where one wavelength component may induce a phase change in another wavelength component. If XPM and SPM are capable of being described in terms of frequency modulation in time of a pulse, then laser optical pulses may potentially be dispersive delayed to at least partially compensate for NPR phase modulation.

Chirped pulse amplification (CPA) refers a technique for amplifying an ultrashort laser optical pulse in which an optical pulse being stretched out temporally and spectrally prior to amplification. Without CPA, peak power of a laser pulse, for example, may be limited because a laser pulse with high intensity may damage a gain medium and/or result in optical pulse splitting. In CPA, instead, an ultrashort laser optical pulse is stretched out in time by using an anomalous-dispersion fiber, such as 111 in FIG. 1, to produce a negatively-chirped optical pulse prior to introducing the optical pulse to the gain medium 102 where the optical pulse is amplified. Likewise, the amplified laser pulse is recompressed back to approximately its initial pulse width using a normal-dispersion fiber, such as 112 in FIG. 1, to achieve a negatively-chirped optical pulse achieving relatively higher peak power.

Figure 2:
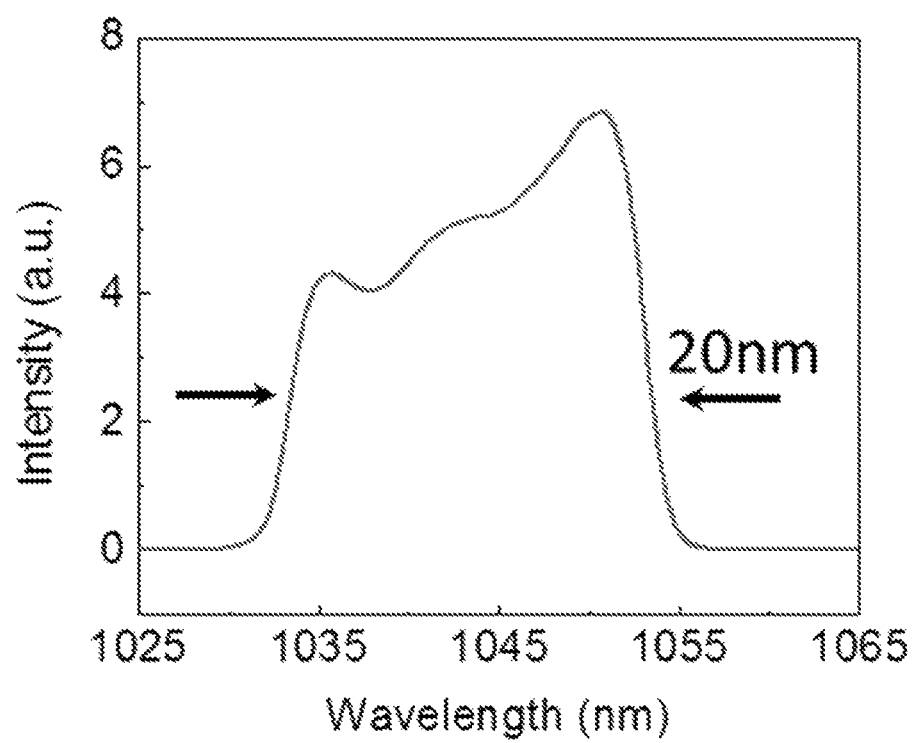
FIG. 2 is a plot of measured optical pulse wavelength for an embodiment.
Figure 3:
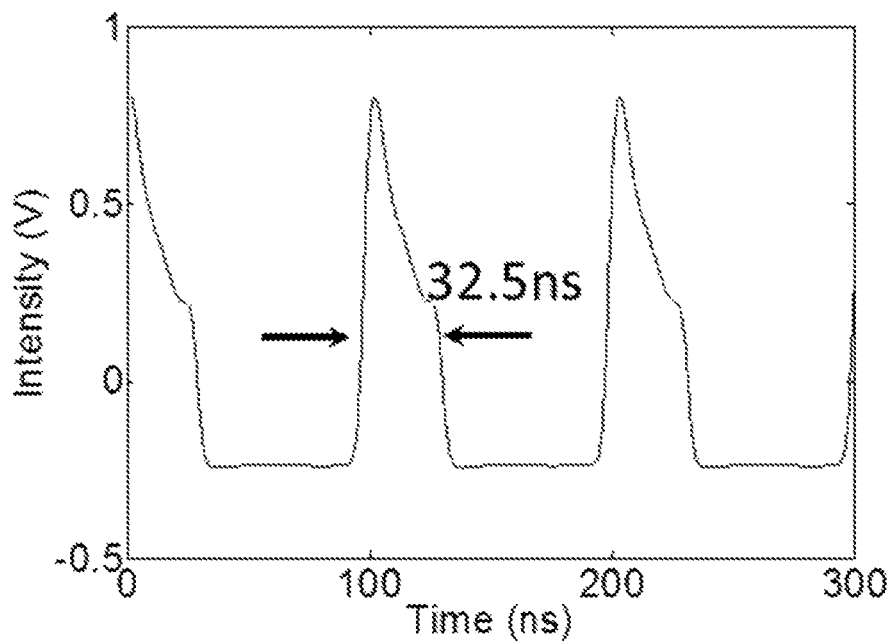
FIG. 3 is a plot of measured optical pulses and temporal pulse width for an embodiment.
Figure 4:
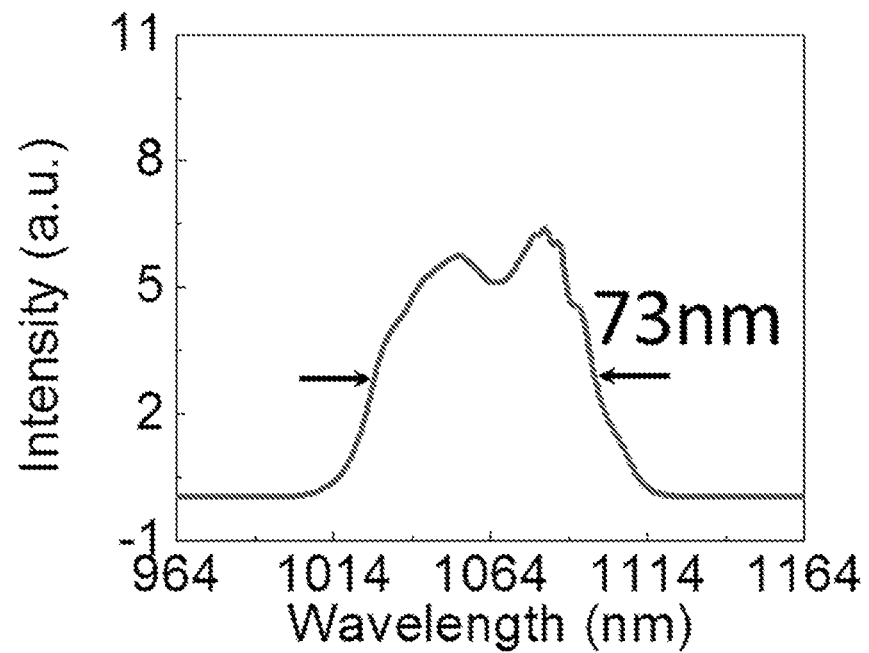
FIG. 4 is a plot of measured optical pulse wavelength for an embodiment.
Figure 5:
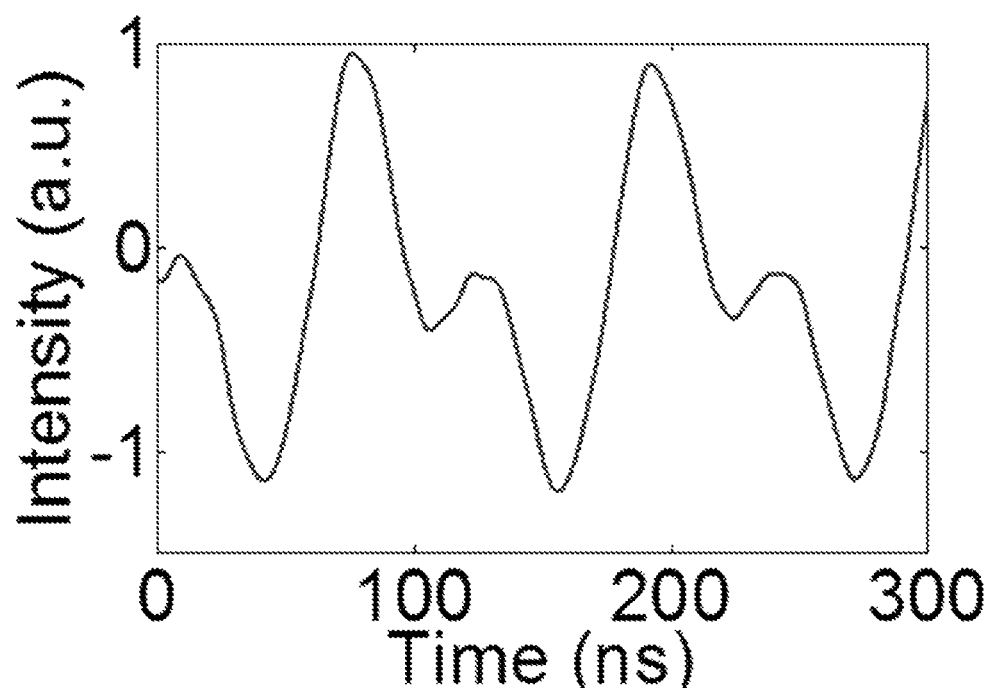
FIG. 5 is a plot of measured optical pulses for an embodiment.

An output signal from a fiber-ring mode-locked laser, may in an embodiment, be passed to an additional wavelength sweeping component (AWS), such as 110 in FIG. 1. For example, a dispersive fiber corresponding to transmitted wavelengths may result in additional wavelength-dispersion of stable optical pulses in addition to wavelength dispersion that may occur in a fiber-ring laser cavity, such as 101. In one embodiment, for example, a dispersive medium may comprise a chirped-Fiber Bragg grating 113 with a 1045 nm operating wavelength for optical pulses, and may provide approximately 1.6 nsec/nm group velocity dispersion. FIG. 2 shows a wavelength spectrum from the AWS with a 20 nm bandwidth centered at 1045 nm. FIG. 3 shows a temporal plot of stable optical pulses generated at a 9.4 MHz repetition rate with a 30.5% duty cycle. A 32.5 nsec temporal pulse width shown in FIG. 3 corresponds to a 20 nm bandwidth of FIG. 2. By adjusting polarization, such as via 106 and 107 of FIG. 1, as previously described, it is possible to further increase an optical pulse width wavelength spectrum, e.g. FIG. 4 shows a plot where measured wavelength dispersion increases to 73 nm as a result. A corresponding plot of a measured 9.4 MHz repetition rate and temporal pulse behavior is shown in FIG. 5. Dispersed wavelengths comprise a full, approximately 100%, duty cycle. Comparison of FIGS. 4 and 5 show that measured optical wavelength spectrum is consistent with a temporal shape of optical pulses, e.g. from using a positive-dispersion optical fiber.

Figure 6:
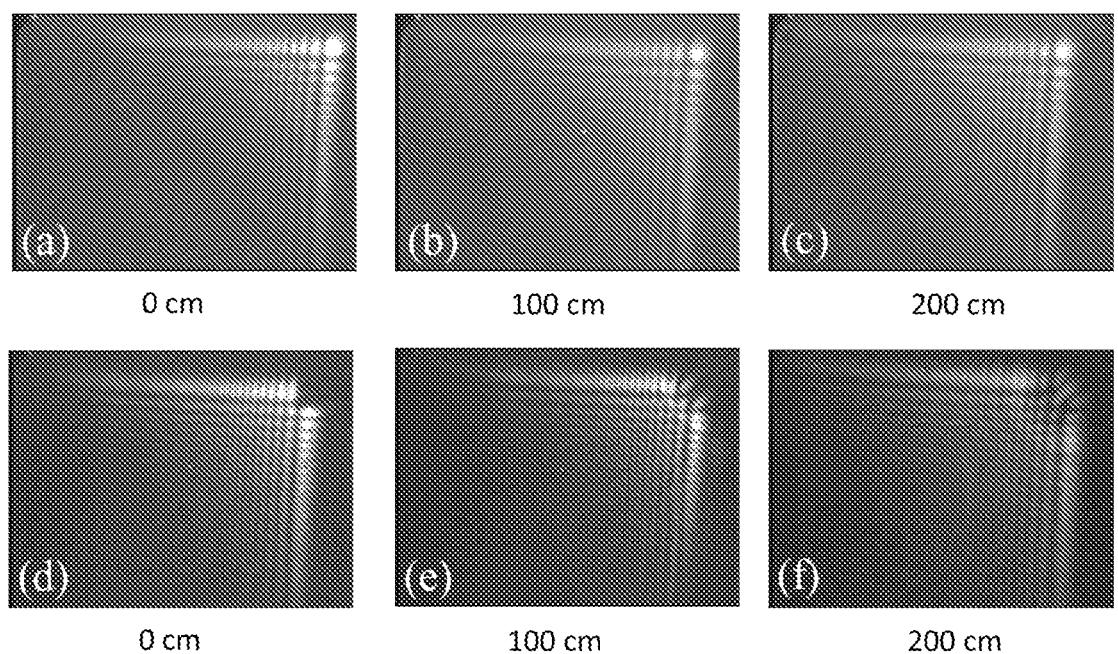
FIG. 6 are images at various depth of fields (DOFs) substantially in accordance with an embodiment.

In one embodiment, stable optical pulses may pass through a collimator (Thorlabs TC06APC-1064) after exiting AWS 110 and may be passed a cubic phase mask (CPM) 114. In one embodiment, a CPM, such as 114, has an element clear aperture of 9.2 mm and transmission efficiency over 98% at an operating wavelength of 1064 nm. A convolved output signal may result in an Airy-beam profile. A beam profile may be measured with an IR camera 115 as depth of field (DOF) is changed, e.g. FIG. 6 shows an Airy beam profile measured at 1 m intervals after a Fourier plane of a focus lens. FIGS. 6(a)-(c) show diffraction-free Airy-beam profiles at 1064 nm wavelength at 0, 100 cm, and 200 cm respectively. A self-healing property of an Airy-beam is shown in FIGS. 6(d)-(f). As shown in FIG. 6(d), a main lobe of an Airy beam is blocked at 0 cm. A self-healing property of an Airy-beam is shown in FIG. 6(e)-(f) where a blocked main lobe image reappears with respectively greater intensity. In another embodiment a CPM may produce both an Airy-beam and a Gaussian beam profile by adding a diffraction grating in an etched pattern. In another embodiment, a CPM, such as 116, may be inserted into a fiber-ring cavity to extract an Airy-beam with a femto-second temporal pulse width.

Figure 7:
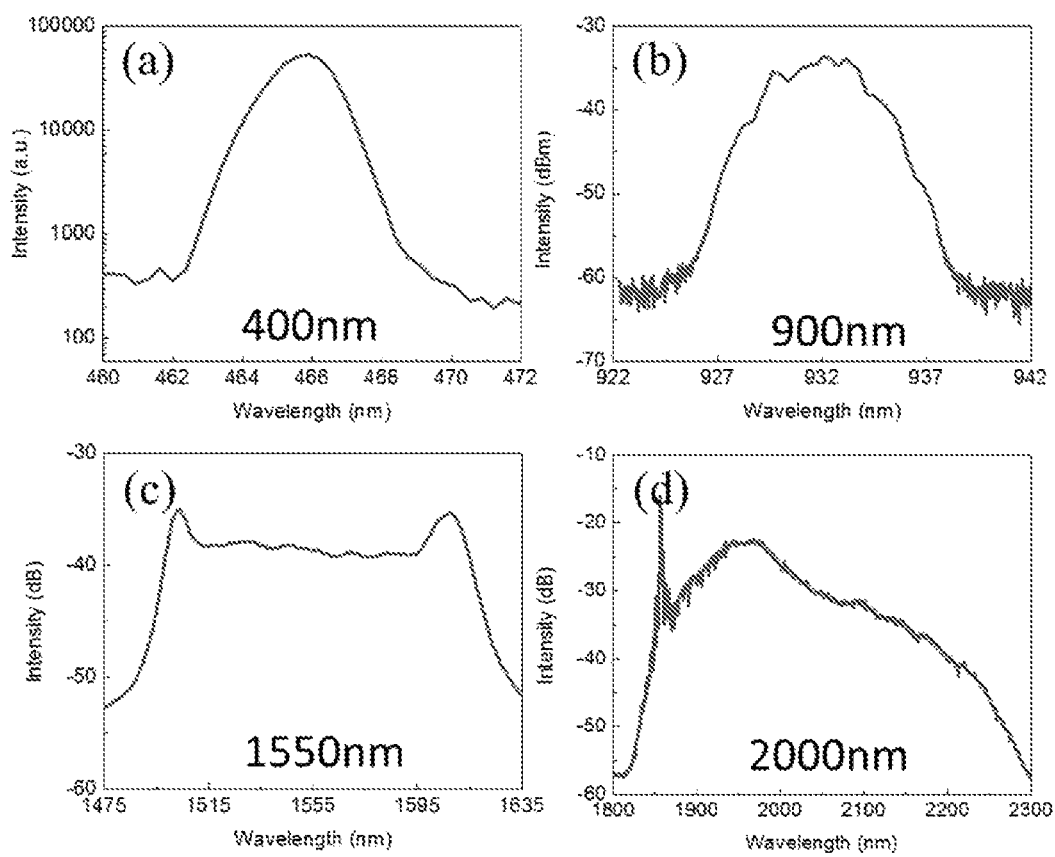
FIG. 7 are plots of measured optical pulse wavelength spectra for various embodiments.

An operating wavelength window of a wave-length dispersed, mode-locked, Airy-beam may be extended into a visible range from approximately 400 nm to 700 nm by interposing other optical processes, such as illustrated by 117 in FIG. 1, between AWP 110 and CPM 114, see e.g. FIG. 7(a) where optical pulse wavelength spectra corresponding to various Airy-beam operating wavelengths are shown. Second harmonic generation, for example, is a well-known optical process, which may result in an operating wavelength reduction by half. Optical parametric amplification may also result in wavelength reduction by difference mixing and may also serve to further amplify stable beam pulses, if desired.

A0. An apparatus comprising: a fiber-ring laser to generate dispersed stable optical pulses, including a fiber-ring cavity, a gain medium, a positive-dispersion fiber, a negative-dispersion fiber, and a polarization controller and filter;
a wavelength-dispersion fiber to further disperse stable optical pulses external to the fiber-ring laser; and
a wave-modulator to cubic phase modulate the dispersed stable optical pulses to generate an Airy beam profile.

A1. An optical transmission system apparatus comprising:
a laser-driven pump-source of optical radiation coupled to a rare-earth doped gain medium as part of a fiber-ring cavity,
wherein the laser-driven pump-source of optical radiation is capable of providing sufficient power to the fiber-ring cavity via a wavelength division multiplexer;
wherein the fiber-ring cavity is capable of generating mode-locked partially-coherent optical pulses dispersed about an operating wavelength;
wherein the fiber-ring cavity comprises: optical fiber elements capable of dispersing wavelength components of amplified mode-locked partially-coherent optical pulses;
wherein a polarization-controller is capable of adjusting polarization rotation of the amplified, mode-locked, optical pulses;
wherein a polarization-isolator is capable of filtering amplified, mode-locked, and polarization-adjusted optical pulses;
wherein the amplified, mode-locked, and polarization-adjusted optical pulses are coupled to at least two optical elements external to the fiber-ring cavity via the wavelength-division multiplexer;
wherein a first external optical element comprises a wavelength-dispersive component and a second external optical element comprises a cubic phase mask; such that an Airy beam is to be produced.

A2 The apparatus of claim A1 wherein the laser-driven pump-source of optical radiation capable of providing sufficient power to the fiber-ring cavity via a wavelength division multiplexer comprises:
a laser-driven pump-source capable of generating near-infra-red wavelengths in a range from approximately 900 nm to approximately 2000 nm, and a laser-driven pump-source power of at least 200 mW; and
a single-mode fiber coupling the laser-driven pump-source of optical radiation to a wavelength-division multiplexer, wherein the laser-driven pump-source of optical radiation is coupled to the fiber-ring cavity.

A3 The apparatus of claim A1 wherein the fiber-ring cavity capable of generating mode-locked, partially-coherent, optical pulses dispersed about an operating wavelength is capable of generating amplified radiation pulses with wavelengths in the range approximately from 1000 nm to approximately 1100 nm; a pulse repetition rate at least in a range from approximately 9 MHz to approximately 11 MHz; a temporal pulse duration at least in the femtosecond-range; and a maximum average power output of at least 100 mW.

A4 The apparatus of claim A1 wherein the optical fiber elements capable of dispersing wavelength components of amplified mode-locked partially-coherent optical pulses comprise:
one optical fiber element having a positive-dispersion and a second optical fiber element having a negative-dispersion, wherein the positive-dispersion is similar to, but relatively greater than the negative-dispersion such that the net dispersion has a relatively positive value and a relatively smaller value than the magnitude of the positive-dispersion fiber or the negative-dispersion fiber.

A5 The apparatus of claim A1 wherein the at least two optical elements external to the fiber-ring cavity via the wavelength-division multiplexer comprise: a first external optical element comprising a wavelength-dispersive component, a second external optical element comprising a cubic phase mask, and a third optical element capable of second harmonic generation, such that the wavelengths are to be reduced by approximately one-half of the operating wavelength of the partially coherent, amplified, mode-locked, and such that polarization-adjusted optical pulses are to be produced by the optical coupler.

A6 The apparatus of claim A1 wherein the at least two optical elements external to the fiber-ring cavity comprises:
a first external optical element comprising a wavelength-dispersive component, a second external optical element comprising a cubic phase mask, and
a fourth optical element capable of optical parametric amplification such that the wavelengths are to be reduced and intensity to be further amplified for the partially coherent, mode-locked, and such that polarization-adjusted radiation pulses are to be produced from the optical coupler.

A7 The apparatus of claim A1 wherein the wavelength-dispersive component comprises: a dispersion-compensating optical fiber or a chirped-Bragg-grating optical fiber.

M0. A method comprising:
injecting a fiber-ring cavity with sufficient power to initiate mode-locking optical pulse polarization in the fiber-ring cavity;
adjusting the mode-locked optical pulse polarization in the fiber-ring cavity so as to generate stable optical pulses;
wavelength-dispersing the generated stable optical pulses; and cubic phase modulating the optical pulses after being wavelength-dispersed to generate an Airy beam profile.

M1. An optical transmission method comprising:
injecting a fiber-ring cavity with a pump-laser beam wherein the beam wavelengths correspond to the fiber-optic wavelength operating range supporting light transmission;
amplifying the pump-laser beam via a fiber-optic rare-earth doped gain medium; providing the amplified pump-laser beam with sufficient power to initiate mode-locking in the fiber ring cavity, if coupled by a wavelength-division multiplexer, producing mode-locked optical pulses;
adjusting and filtering the mode-locked optical pulse polarization;
generating mode-locked, polarization-adjusted, optical pulses external to the fiber-ring cavity via a wavelength-division multiplexer;
dispersing wavelength components of the mode-locked, polarization-adjusted, optical pulses external to the fiber-ring cavity via a dispersion-compensating fiber or via a chirped-fiber Bragg-grating;
transforming the wavelength-dispersed, mode-locked, polarization-adjusted, optical pulses external to the fiber-ring cavity via a cubic phase mask to a wavelength-dispersed, mode-locked, optical pulse, polarization-adjusted, Airy beam.

M2 The method of M1, wherein the beam wavelengths correspond to the fiber-optic wavelength operating range supporting light transmission comprise:
near-infrared wavelengths in a range from approximately 900 nm to approximately 2000 nm.

M3 The method of M1, wherein the providing the amplified pump-laser beam with sufficient power to initiate mode-locking in the fiber ring cavity, if coupled by a wavelength-division multiplexer, producing mode-locked optical pulses comprises: providing at least 200 mW of power from a laser-diode coupled to a single-mode fiber to generate mode-locking in the coupled fiber-ring cavity producing optical pulses with a repetition rate of approximately 9 MHz to 11 MHz.

M4 The method of M1, wherein the transforming the wavelength-dispersed, mode-locked, polarization-adjusted, optical pulses external to the fiber-ring cavity comprises:
applying a second harmonic generation process to reduce optical pulse wavelengths by approximately one-half.

M5 The method of M1, wherein the transforming the wavelength-dispersed, mode-locked, polarization-adjusted, optical pulses external to the fiber-ring cavity comprises:
applying an optical parametric amplification to reduce optical pulse wavelengths and amplify optical pulse intensities.

In the preceding description, various aspects of claimed subject matter have been described. For purposes of explanation, specifics, such as amounts, systems and/or configurations, as examples, were set forth. In other instances, well-known features were omitted and/or simplified so as not to obscure subject matter intended to be covered by one or more claims. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:
1. An apparatus comprising:
a fiber-ring laser that generates dispersed stable optical pulses, including a fiber-ring cavity comprising a gain medium configured to amplify the optical pulses, a positive-dispersion fiber, a negative-dispersion fiber, a first wave-modulator, and a polarization controller and filter, the gain medium being coupled with the positive-dispersion fiber at one end to receive output from the positive-dispersion fiber and coupled with the negative-dispersion fiber at another end to transmit the amplified optical pulses to the negative-dispersion fiber;
a wavelength-dispersion fiber that further disperses stable optical pulses external to the fiber-ring laser; and
a second wave-modulator that cubic phase modulates the dispersed stable optical pulses to generate an Airy beam profile.

2. An optical transmission system apparatus comprising:
a laser-driven pump-source of optical radiation coupled to a rare-earth doped gain medium as part of a fiber-ring cavity,
wherein the laser-driven pump-source of optical radiation is capable of providing sufficient power to the fiber-ring cavity via a wavelength division multiplexer;
wherein the fiber-ring cavity is capable of generating mode-locked partially-coherent optical pulses dispersed about an operating wavelength;
wherein the fiber-ring cavity comprises: a wave-modulator and optical fiber elements capable of dispersing wavelength components of amplified mode-locked partially-coherent optical pulses;
wherein a polarization-controller is capable of adjusting polarization rotation of the amplified, mode-locked, optical pulses;
wherein a polarization-isolator is capable of filtering amplified, mode-locked, and polarization-adjusted optical pulses;
wherein the amplified, mode-locked, and polarization-adjusted optical pulses are coupled to at least two optical elements external to the fiber-ring cavity;
wherein a first external optical element comprises a wavelength-dispersive component and a second external optical element comprises a cubic phase mask; such that an Airy beam is to be produced, and
wherein the gain medium is configured to amplify the optical pulses, the gain medium being coupled with a positive-dispersion fiber at one end to receive output from the positive-dispersion fiber and coupled with a negative-dispersion fiber at another end to transmit the amplified optical pulses to the negative-dispersion fiber.

3. The apparatus of claim 2 wherein the laser-driven pump-source of optical radiation capable of providing sufficient power to the fiber-ring cavity via the wavelength division multiplexer comprises:
a laser-driven pump-source capable of generating near-infra-red wavelengths in a range from approximately 900 nm to approximately 2000 nm, and a laser-driven pump-source power of at least 200 mW; and
a single-mode fiber coupling the laser-driven pump-source of optical radiation to the wavelength-division multiplexer, wherein the laser-driven pump-source of optical radiation is coupled to the fiber-ring cavity.

4. The apparatus of claim 2 wherein the fiber-ring cavity capable of generating mode-locked, partially-coherent, optical pulses dispersed about an operating wavelength is capable of generating amplified radiation pulses with wavelengths in the range from approximately 1000 nm to approximately 1100 nm; a pulse repetition rate at least in a range from approximately 9 MHz to approximately 11 MHz; a temporal pulse duration at least in the femtosecond-range; and a maximum average power output of at least 100 mW.

5. The apparatus of claim 2 wherein the optical fiber elements capable of dispersing wavelength components of amplified mode-locked partially-coherent optical pulses comprise:
one optical fiber element having a positive-dispersion and a second optical fiber element having a negative-dispersion, wherein the positive-dispersion is similar to, but relatively greater than the negative-dispersion such that the net dispersion has a relatively positive value and a relatively smaller value than the magnitude of the positive-dispersion fiber or the negative-dispersion fiber.

6. The apparatus of claim 2, further comprising
a third optical element capable of second harmonic generation, such that the wavelengths are to be reduced by approximately one-half of the operating wavelength of the partially coherent, amplified, mode-locked, and such that polarization-adjusted optical pulses are to be produced by the at least two optical elements.

7. The apparatus of claim 2, further comprising
a third optical element capable of optical parametric amplification such that the wavelengths are to be reduced and intensity to be further amplified for the partially coherent, mode-locked, and such that polarization-adjusted radiation pulses are to be produced from the at least two optical elements.

8. The apparatus of claim 2 wherein the wavelength-dispersive component comprises: a dispersion-compensating optical fiber or a chirped-Bragg-grating optical fiber.

9. A method comprising:
injecting a fiber-ring cavity with sufficient power to initiate mode-locking optical pulse polarization in the fiber-ring cavity;
adjusting the mode-locked optical pulse polarization in the fiber-ring cavity so as to generate stable optical pulses;
wavelength-dispersing the generated stable optical pulses; and
cubic phase modulating the optical pulses after being wavelength-dispersed to generate an Airy beam profile;
wherein the fiber-ring cavity comprises a wave-modulator and a gain medium configured to amplify the optical pulses, the gain medium being coupled with a positive-dispersion fiber at one end to receive output from the positive-dispersion fiber and coupled with a negative-dispersion fiber at another end to transmit the amplified optical pulses to the negative-dispersion fiber.

10. An optical transmission method comprising:
injecting a fiber-ring cavity comprising a wave-modulator with a pump-laser beam wherein the beam wavelengths correspond to the fiber-optic wavelength operating range supporting light transmission;
amplifying the pump-laser beam via a fiber-optic rare-earth doped gain medium;
providing the amplified pump-laser beam with sufficient power to initiate mode-locking in the fiber ring cavity, if coupled by a wavelength-division multiplexer, producing mode-locked optical pulses;
adjusting and filtering the mode-locked optical pulse polarization;
generating mode-locked, polarization-adjusted, optical pulses external to the fiber-ring cavity;
dispersing wavelength components of the mode-locked, polarization-adjusted, optical pulses external to the fiber-ring cavity via a dispersion-compensating fiber or via a chirped-fiber Bragg-grating;
transforming the wavelength-dispersed, mode-locked, polarization-adjusted, optical pulses external to the fiber-ring cavity via a cubic phase mask to a wavelength-dispersed, mode-locked, optical pulse, polarization-adjusted, Airy beam,
wherein the gain medium is configured to amplify the optical pulses, the gain medium being coupled with a positive-dispersion fiber at one end to receive output from the positive-dispersion fiber and coupled with a negative-dispersion fiber at another end to transmit the amplified optical pulses to the negative-dispersion fiber.

11. The method of 10, wherein the beam wavelengths correspond to the fiber-optic wavelength operating range supporting light transmission comprise:
near-infrared wavelengths in a range from approximately 900 nm to approximately 2000 nm.

12. The method of 10, wherein the providing the amplified pump-laser beam with sufficient power to initiate mode-locking in the fiber ring cavity, if coupled by the wavelength-division multiplexer, producing mode-locked optical pulses comprises:
providing at least 200 mW of power from a laser-diode coupled to a single-mode fiber to generate mode-locking in the coupled fiber-ring cavity producing optical pulses with a repetition rate of approximately 9 MHz to 11 MHz.

13. The method of 10, wherein the transforming the wavelength-dispersed, mode-locked, polarization-adjusted, optical pulses external to the fiber-ring cavity comprises:
applying a second harmonic generation process to reduce optical pulse wavelengths by approximately one-half.

14. The method or 10, wherein the transforming the wavelength-dispersed, mode-locked, polarization-adjusted, optical pulses external to the fiber-ring cavity comprises:
applying an optical parametric amplification to reduce optical pulse wavelengths and amplify optical pulse intensities.

* * * * *